United States Patent [19]
Arnold et al.

[11] Patent Number: 5,847,032

[45] Date of Patent: Dec. 8, 1998

[54] SULFO-PENDENT ARYLETHERKETONE COPOLYMERS FILM CONTAINING NLO CHROMOPHORE

[75] Inventors: Fred E. Arnold, Centerville; Narayanan Venkatasubramanian, Bellbrook, both of Ohio

[73] Assignee: The United States of America as represented by the Secretary of the Air Force, Washington, D.C.

[21] Appl. No.: 848,445

[22] Filed: May 8, 1997

[51] Int. Cl.[6] .................... C08K 5/12; C08K 5/18
[52] U.S. Cl. .................... 524/84; 524/86; 524/89; 524/110; 524/237
[58] Field of Search .................... 528/125, 128; 524/84, 86, 89, 110, 237

[56] References Cited

U.S. PATENT DOCUMENTS

| | | | |
|---|---|---|---|
| 5,049,642 | 9/1991 | Hendy | 528/171 |
| 5,362,836 | 11/1994 | Helmer-Metzmann et al. | 528/125 |
| 5,492,996 | 2/1996 | Dang et al. | 528/171 |
| 5,510,424 | 4/1996 | Helmer-Metzmann et al. | 524/420 |
| 5,594,075 | 1/1997 | Reinhardt et al. | 525/426 |

OTHER PUBLICATIONS

N. Venkatasubramanian, D. Dean and F.E. Arnold, "Poly(Arylene Ethers) Containing Sulfonic Acid Pendent Groups: Synthesis, Properties and Potential Applications", Polymer Preprints, vol. 37, No. 2, Aug. 1996, published Aug. 2, 1996.

*Primary Examiner*—Jeffrey C. Mullis
*Attorney, Agent, or Firm*—Charles E. Bricker; Thomas L. Kundert

[57] ABSTRACT

An aryletherketone copolymer having repeating units of the formula:

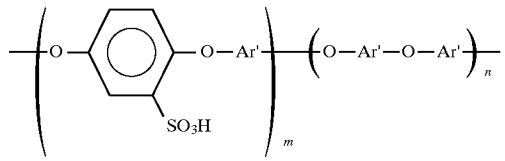

wherein the ratio m:n is in the range of 1:99 to 99:1; wherein Ar is selected from the group consisting of:

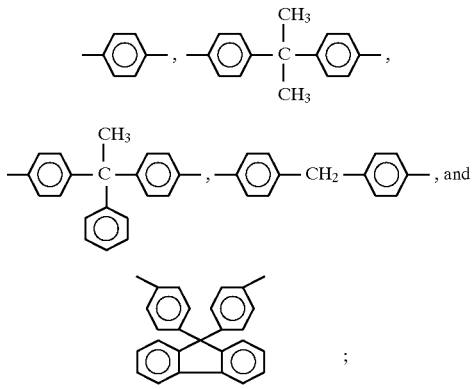

and wherein Ar' is selected from the group consisting of

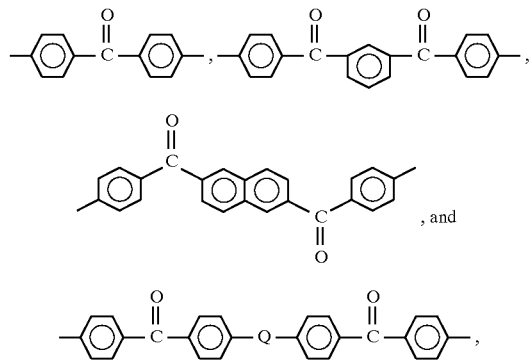

wherein Q is —O—, —CH$_2$— or —CO—, is useful in the dispersion of active NLO chromophores containing a basic functionality to form optically clear films.

7 Claims, No Drawings

SULFO-PENDENT ARYLETHERKETONE COPOLYMERS FILM CONTAINING NLO CHROMOPHORE

RIGHTS OF THE GOVERNMENT

The invention described herein may be manufactured and used by or for the Government of the United States for all governmental purposes without the payment of any royalty.

BACKGROUND OF THE INVENTION

The present invention relates to aryletherketone copolymer compositions containing pendent sulfo groups for ionic interaction with second order NLO chromophores.

Considerable research effort has been directed toward the use of organic second-order nonlinear (NLO) polymers in practical devices. The predicted advantages of such organic polymers for frequency conversion and integrated optics applications is headed by potential ease of fabrication and low cost. The polymer properties necessary to efficiently frequency double light at 800 nm in a slab waveguide device include a $\chi^{(2)}$ of 60 pm/V ($\mu\beta=350\times10^{-30}$ esu D) and no absorption at 400 nm.

For a polymeric material to have successful application in an electro-optic (EO) device, it needs to possess a somewhat different set of properties. A practical EO polymer must be spin coatable, easily poled by an electric field or self-assembled, have optical losses below 1 dB/cm and be capable of producing devices with modulation bandwidths of 100 GHz. For a NLO EO polymer material to be commercially realistic, it must also be able to retain a reasonable second-order activity (>30 pm/V at 830 nm) at temperatures experienced during routine microelectronics circuit fabrication (as high as 320° C. for 20 min.). For military applications, it is further necessary that a material retain at least 95% of its original EO coefficient after 10 years at 125° C. Finally, the synthesis of any polymeric material for potential commercial use must address the issues of low cost producibility, toxicity/carcinogenicity and waste disposal.

Reinhardt et al, U.S. Pat. No. 5,594,075, issued Jan. 14, 1997, disclose an acetylenic thermoset monomer which, when mixed with high performance thermoplastic materials, can be poled and cured at elevated temperatures to provide composites with second-order nonlinear optical (NLO) activity, improved thermal stability and optical transparency at wavelengths shorter than 830 nm.

Other research efforts have been directed toward the incorporation of highly active NLO chromophores in guest host polymers. However, guest host polymer systems containing 20 to 30% by weight chromophores tend to phase separate, causing light scattering and loss of optical clarity.

We have prepared high molecular weight sulfo-pendent aryletherketone polymers and copolymers which provide an ionic association mechanism for basic NLO chromophores. Monodispersed optically clear films are obtained via the ionic association of the sulfonic acid groups on the polyaryletherketone and the basic functionality of the NLO chromophore.

Accordingly, it is an object of the present invention to provide high molecular weight sulfo-pendent aryletherketone copolymers.

It is another object of the present invention to provide optically clear films of the sulfo-pendent aryletherketone copolymers and active NLO chromophores.

Other objects and advantages of the present invention will be apparent to those skilled in the art.

SUMMARY OF THE INVENTION

In accordance with the present invention there is provided an aryletherketone copolymer having repeating units of the formula:

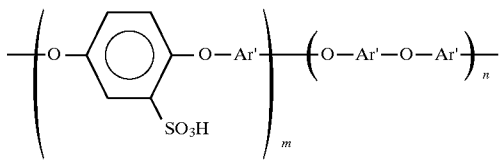

wherein the ratio m:n is in the range of 1:99 to 99:1; wherein Ar is selected from the group consisting of:

and wherein Ar' is selected from the group consisting of wherein Q is —O—, —CH$_2$— or —CO—.

DETAILED DESCRIPTION OF THE INVENTION

The copolymer of this invention is prepared by the polycondensation of hydroquinone potassium sulfonate with an aromatic bis-diol and a difluoro aromatic ketone. Aromatic bis-diols suitable for use in the present invention have the formula HO—Ar—OH, wherein Ar is as defined above. Suitable aromatic bis-diols include hydroquinone, 2,2-bis(4-hydroxyphenyl) propane, 1-methyl-1-phenylbis(4-hydroxyphenyl) propane, bis(4-hydroxypheny) methane, and 9,9-bis(4-hydroxyphenyl) fluorene. Difluoro aromatic ketones suitable for use in the present invention have the formula F—Ar'—F, wherein Ar' is as defined above. Suitable difluoro aromatic ketones include 4,4'-difluorobenzophenone, 1,3-bis(4-fluorobenzoyl)benzene, 4,4'-bis(4-fluorobenzoyl) diphenylether, 4,4'-bis(4-fluorobenzoyl) diphenylmethane, 4,4'-bis(4-fluorobenzoyl) diphenylketone, and 2,6-bis(4-fluorobenzoyl) naphthalene.

The polycondensation is conveniently carried out in N-methylpyrrolidone (NMP) using potassium carbonate to generate the potassium salts of the bis-diols. The water formed from the salt generation can be removed as an azeotrope with benzene or toluene. Following removal of this water, additional NMP is added to facilitate stirring. The temperature of the reaction mixture is increased step-wise over a period of about 24 to 48 hours to about 210° to 225° C.

The resulting potassium sulfonate copolymer is recovered from solution by pouring the solution into an excess of a non-solvent for the polymer, e.g., methanol. The copolymer is then filtered, washed and dried.

The potassium sulfonate copolymer is converted to the corresponding sulfonic acid copolymer by refluxing the former in dilute HCl. Alternatively, the potassium sulfonate copolymer can be dissolved in methanesulfonic acid (MSA), then precipitated in distilled water.

The copolymer of this invention is soluble in aprotic solvents, such as N,N-dimethylacetamide (DMAc); the copolymer is insoluble in water and alcohol.

The primary utilization of the copolymer of this invention is in the dispersion of active NLO chromophores to form optically clear films. The chromophores to be dispersed must contain a basic functionality and must be soluble in an aprotic solvent. Suitable NLO chromophores include the following:

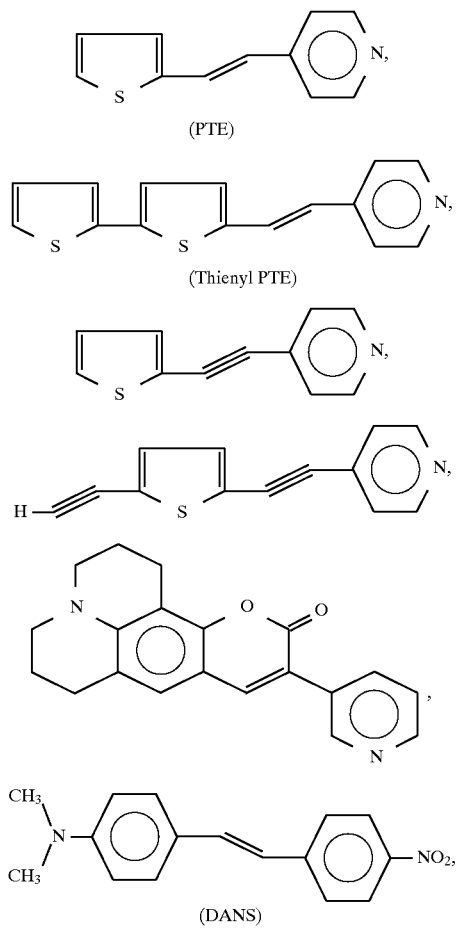

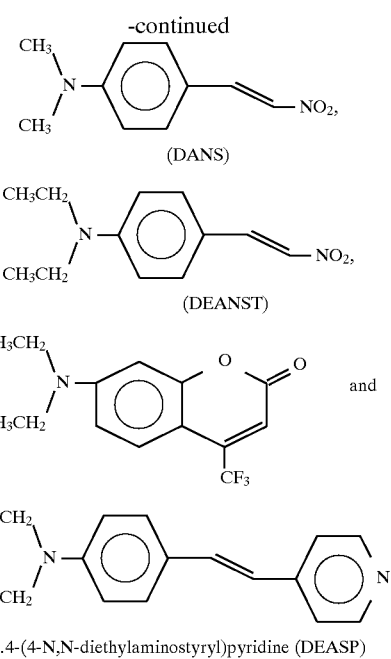

.4-(4-N,N-diethylaminostyryl)pyridine (DEASP)

These chromophores either contain a dialkylamine or pyridine moiety which forms an ionic association with the pendent sulfo groups of the host copolymer. The wt % loading of the chromophore is a function of the equivalent sulfo content of the copolymer.

The following examples illustrate the invention.

EXAMPLE I

1:1 sulfo-pendent copolyarylene ether ketone derived from hydroguinone 2-potassium sulfonate, hydroguinone and 4,4'-difluorobenzophenone Hydroquinone 2-potassium sulfonate (2.0748 g, 0.0091 moles), recrystallized hydroquinone (1.008 g, 0.0091 moles), 4,4'-difluorobenzophenone (3.9665 g, 0.0182 moles) and anhydrous potassium carbonate (5.0890 g, 0.0368 moles) were heated in the presence of 20 ml NMP and 40 ml benzene. The mixture was heated to reflux with the water from the formation of the bisdiol salts being removed as a benzene azeotrope by a Dean Stark trap. An additional 60 ml NMP was added and the mixture heated to 125° C. under a nitrogen atmosphere. The reaction mixture was kept at 125° C. overnight and then raised to 160° C., when extensive dissolution of the solids was observed resulting in a darkish green solution. The temperature of the solution was maintained at 175° C. overnight. It was raised to a temperature range 210° C.–225° C. and nearly 60 ml NMP was distilled off under a rapid nitrogen purge. The concentrated solution was left overnight at 160° C. After cooling, the viscous polymer solution was poured into a large excess (800 ml) MeOH. Strands of off-white fibrous polymer were obtained. They were mashed up in a blender as a methanolic slurry. The polymer was filtered, washed with more methanol and dried. A total of 6 gms of copolymer was obtained after mechanical losses during blending etc. Approximately 2 gms of the copolymer were stirred in 400 ml distilled water for several hours to remove inorganics. This was filtered, washed with more distilled water and dried. Microanalytical data (for sample dried in vacuum at 100° C.): Calculated: C, 65.69; H, 3.34; S, 4.61; K, 5,63. Found: C, 64.22; H, 3.44; S, 4.20; K, 5.12.

In order to obtain the sulfonic acid polymer, 1.3 gms of the copolymer potassium sulfonate was heated with a dil. HCl solution (5 ml Conc.HCl+20 ml deionized water) for two hours. The solution was decanted and replaced with a fresh batch of dil.HCl. The polymer-dil.HCl mixture was refluxed for three more hours. The mixture was cooled, filtered and the polymer was repeatedly washed with deionized water and dried at 100° C. in vacuum. Microanalytical data: Calculated: C, 69.50; H, 3.69; S, 4.88; K, 0.00. Found: C, 65.36; H, 3.90; S, 4.42; K, 0.12. Inherent viscosity (0.5 g/dl, 1% LiCl in DMAc, 30° C.) was 1.05 dl/g.

EXAMPLE II

1:1 sulfo-pendent copolyarylene ether ketone derived from hydroquinone 2-potassium sulfonate, hydroguinone and 1,3-bis-(4-fluorobenzoyl) benzene Hydroquinone 2-potassium sulfonate (1.563 g, 0.0068 moles), hydroquinone (0.7541 g, 0.0068 moles), 1,3-bis-(4-fluorobenzoyl)benzene (4.4148 g, 0.0137 moles), anhydrous potassium carbonate (3.838 g, 0.0277 moles) were heated in the presence of 25 ml of anhydrous NMP and 40 ml of anhydrous benzene. Under a nitrogen atmosphere, the mixture was heated to reflux with the water from the formation of the bisdiol salts being removed as a benzene azeotrope by a Dean Stark trap. A creamy yellow suspension was obtained and a fresh feed of benzene (45 ml) was added and the reflux/recycle was continued. The azeotrope was drawn off and residual benzene in the flask was distilled off under a vigorous nitrogen flow, leaving a yellowish slurry in the flask. An additional 55 ml fresh, anhydrous NMP was added to the cooled flask and the reaction mixture was maintained at 125° C. overnight to obtain a greenish yellow suspension. The oil bath temperature was then raised to 160° C. to obtain a dark green solution. The polymerization solution was left overnight at 175° C. with vigorous stirring. The temperature was raised to 215° C. and nearly 65 ml NMP was distilled off under a brisk nitrogen flow. The concentrated solution was left stirring at 175° C. overnight. The cooled viscous dope was diluted with 10 ml NMP and was poured into a large excess (800 ml) of MeOH resulting in the precipitation of a fibrous polymer. This was broken up into a powdery material in a blender, filtered and dried. The copolymer was stirred vigorously with 500 ml distilled water overnight and dried to obtain 5.75 g (93% isolated yield). Some of the polymer was soxhelet-extracted with boiling water to remove traces of inorganic salts. This was finally vacuum dried at 100° C. for 24 hours. Microanalytical data; Calculated (%): C, 69.16; H, 3.47; S, 3.55; K, 4.33. Found (%): C, 66.29; H, 3.53; S, 3.09; K, 4.21. This was cast as a tough film from a DMAc solution.

The copolymer potassium sulfonate was converted into the corresponding sulfonic acid by dissolving the copolymer (1.0 g) in 12 ml methanesulfonic acid (5.5 wt % polymer), stirring the solution for 48 hours at room temperature and precipitating the fibrous polymer in a large excess of deionized, distilled water. This was washed with distilled water and finally soxhelet-extracted with hot water over 24 hours to remove traces of MSA. This was dried at 100° C. in vacuum. Microanalytical data: Calculated (%): C, 72.21; H, 3.74; S, 3.71 and K, 0.00. Found: (%) C,68.73; H, 4.00; S, 3.32; K, 0.05%. Inherent viscosity (0.5 g/dl, DMAc, 30° C.) was 0.94 dl/g.

EXAMPLE III

NLO film containing 1-(4-pyridyl)-2-(2-thienyl) ethene (PTE)

To a 10 ml DMAc solution containing 0.060 g of the copolymer of Example I was added a colorless solution of the chromophore (0.014 g) in 5 ml DMAc. The yellow solution was stirred for an hour and filtered and a bright, transparent yellow film was cast after removal of the solvent in high vacuum for 72 hours. The film was isolated by addition of water to the casting dish and dried in air. Weight of the NLO chromophore monodispersed in the copolymer matrix was 19%, close to 1:1 molecular stoichiometry for the ionic association of the sulfonic acid pendent of the matrix with the pyridinyl functionality of the NLO chromophore.

EXAMPLE IV

NLO film containing 1-(4-pyridyl)-2-(5-(2,2'-bithienyl)) ethene (thienyl PTE)

A DMAc solution of the sulfo-copolymer of Example I (0.063 g in 8 ml) was mixed with a yellow solution of the NLO chromophore (0.021 g) in 4 ml DMAc to obtain a bright orange solution. After stirring for a few hours, the filtered solution was taken in a glass casting dish and DMAc was evaporated off under high vacuum in a vacuum desiccator over 72 hours. The homogeneous, transparent orange film was isolated by addition of water to the casting dish and dried in air. Weight of the second-order NLO chromophore dispersed in the sulfo-copolymer matrix was 25%, close to 1:1 molecular stoichiometry for the ionic association of the sulfonic acid pendent of the matrix with the pyridinyl functionality of the NLO chromophore.

EXAMPLE V

NLO film containing 1-(4-pyridyl)-2-(2-thienyl) ethene (PTE)

A DMAc solution of the sulfo-copolymer of Example II (0.085 g in 8 ml) was mixed with a colorless solution of the NLO chromophore (0.017 g) in 4 ml DMAc. The yellow solution was stirred, filtered and subjected to high vacuum over 72 hours to obtain a clear, yellow film which was isolated by addition of water to the dish. The weight of the chromophore dispersed in the copolymer matrix was 17%, close to 1:1 molecular stoichiometry for the ionic association of the sulfonic acid pendent of the matrix with the pyridinyl functionality of the NLO chromophore.

EXAMPLE VI

NLO film containing 1-(4-N,N-diethylaminophenyl) -2-nitroethene (DEANST)

A DMAc solution of the sulfo-copolymer of Example I (0.066 g in 8 ml DMAc) was mixed with an orange red solution of the NLO chromophore (0.0195 g in 4 ml DMAc) and stirred for a few hours. The filtered solution was taken in a casting dish and subjected to high vacuum over 72 hours to obtain a transparent, reddish orange film which was isolated by addition of water to the dish. The weight of the chromophore dispersed in the copolymer matrix was 23%, close to 1:1 molecular stoichiometry for the ionic association of the sulfonic acid pendent of the matrix with the N,N-dialkylamino functionality of the NLO chromophore.

EXAMPLE VII

NLO film containing 2-ethynyl-5-(4-pyridyl) ethynylthiophene

A DMAC solution of the sulfo-copolymer of Example I (0.033 g in 4 ml DMAc) was mixed with a brownish yellow solution of the thermosettable NLO chromophore (0.01 g in 3 ml DMAc) and the homogeneous solution was stirred for a few hours. The filtered solution was taken in a casting dish and subjected to high vacuum for 72 hours to obtain a transparent, brownish yellow film which was released by the addition of water to the casting dish. The weight of the chromophore dispersed in the sulfo-copolymer was 23%, corresponding to 1:1 molecular stoichiometry for the ionic association of the sulfonic acid pendent of the matrix with the pyridinyl functionality of the NLO chromophore.

EXAMPLE VIII

NLO film containing 4-(4-N,N-diethylaminostyryl) pyridine (DEASP)

A DMAc solution of the sulfo-copolymer of Example I (0.066 g in 8 ml) was mixed with a yellow solution of the NLO chromophore (0.022 g in 4 ml DMAc) to obtain an homogeneous, deep red solution. After stirring, the filtered solution was taken in a glass casting dish and DMAc was evaporated off under high vacuum for 72 hours. The deep red, transparent NLO film was floated off the dish by addition of water and dried. Weight of the second-order NLO chromophore dispersed in the polymer matrix was 25%, corresponding to 1:1 molecular stoichiometry for the ionic association of the sulfonic acid pendent of the matrix polymer with the pyridinyl functionality of the chromophore.

Various modifications may be made in the instant invention without departing from the spirit and scope of the appended claims.

We claim:

1. A NLO film consisting essentially of an aryletherketone copolymer having repeating units of the formula:

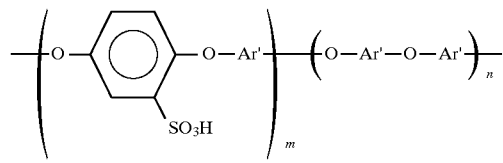

wherein Ar is selected from the group consisting of:

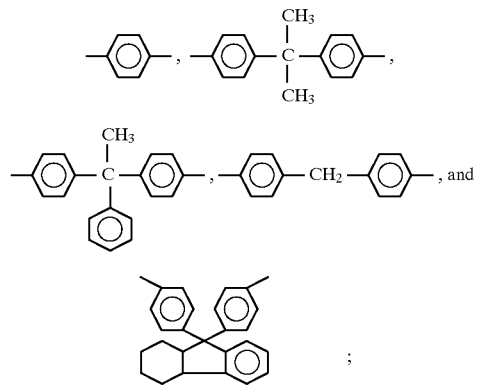

wherein Ar' is selected from the group consisting of

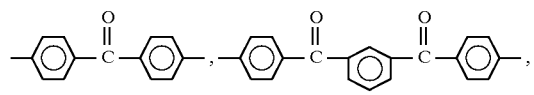

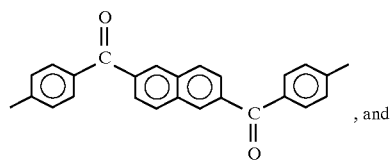

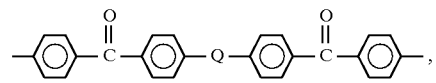

wherein Q is —O—, —CH$_2$—or —CO—, and wherein the ratio m:n is in the range of 1:99 to 99:1;

and a chromophore selected from the group consisting of

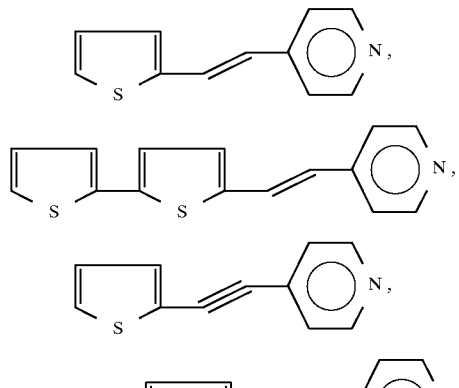

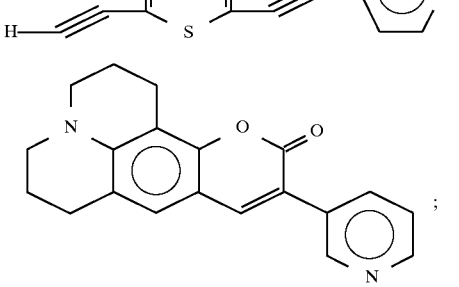

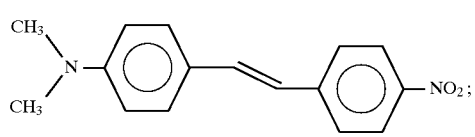

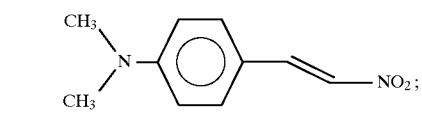

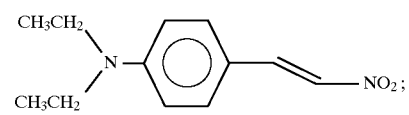

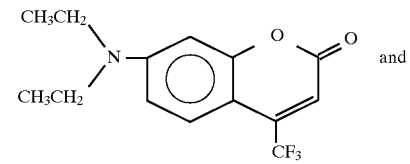

-continued

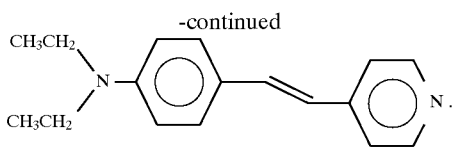

2. The NLO film of claim 1 wherein Ar is

and wherein Ar' is

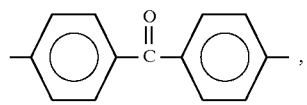

and the ratio m:n 1:1, and wherein said chromophore is 1-(4-pyridyl)-2-(2-thienyl)ethene.

3. The NLO film of claim 1 wherein Ar is

wherein Ar' is

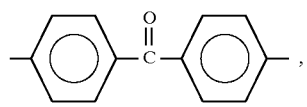

and the ratio m:n 1:1, and wherein said chromophore is 1-(4-pyridyl)-2-(5-(2,2'-bithienyl))ethene.

4. The NLO film of claim 1 wherein Ar is

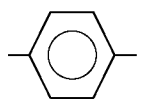

wherein Ar' is

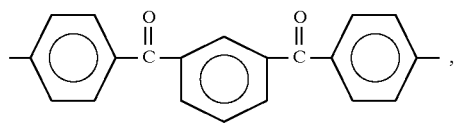

and the ratio m:n 1:1, and wherein said chromophore is 1-(4-pyridyl)-2-(2-thienyl)ethene.

5. The NLO film of claim 1 wherein Ar is

wherein Ar' is

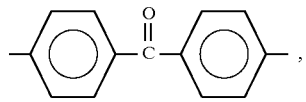

and the ratio m:n 1:1, and wherein said chromophore is 1-(4-N,N-diethylaminophenyl)-2-nitroethene.

6. The NLO film of claim 1 wherein Ar is

wherein Ar' is

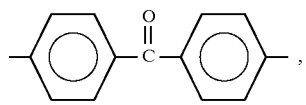

and the ratio m:n 1:1, and wherein said chromophore is 2-ethynyl-5-(4-pyridyl)ethynylthiophene.

7. The NLO film of claim 1 wherein Ar is

wherein Ar' is

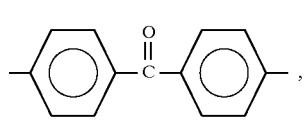

and the ratio m:n 1:1, and wherein said chromophore is 4-(4-N,N-diethylaminostyryl)pyridine.

* * * * *